(12) United States Patent
Pettersson

(10) Patent No.: US 11,489,324 B2
(45) Date of Patent: Nov. 1, 2022

(54) EXTENSION FRAME

(71) Applicant: Roxtec AB, Karlskrona (SE)

(72) Inventor: Ronnie Pettersson, Jamjo (SE)

(73) Assignee: Roxtec AB, Karlskrona (SE)

( * ) Notice: Subject to any disclaimer, the term of this patent is extended or adjusted under 35 U.S.C. 154(b) by 334 days.

(21) Appl. No.: 16/646,371

(22) PCT Filed: Aug. 30, 2018

(86) PCT No.: PCT/SE2018/050870
§ 371 (c)(1),
(2) Date: Mar. 11, 2020

(87) PCT Pub. No.: WO2019/054911
PCT Pub. Date: Mar. 21, 2019

(65) Prior Publication Data
US 2020/0274341 A1    Aug. 27, 2020

(30) Foreign Application Priority Data
Sep. 12, 2017    (SE) .................................... 1751103-1

(51) Int. Cl.
*F16L 3/00*    (2006.01)
*H02G 3/22*    (2006.01)
(Continued)

(52) U.S. Cl.
CPC .................. *H02G 3/22* (2013.01); *F16L 5/04* (2013.01); *H02G 3/0412* (2013.01)

(58) Field of Classification Search
CPC ............ H02G 3/22; H02G 3/0412; F16L 5/04
See application file for complete search history.

(56) References Cited

U.S. PATENT DOCUMENTS 4,291,195 A    9/1981    Blomqvist et al.
5,344,106 A    9/1994    Beele
(Continued)

FOREIGN PATENT DOCUMENTS

DE    2414687 A1    10/1975
DE    20 2007 000 727 U1    5/2007
(Continued)

OTHER PUBLICATIONS

English Translation of CN Office Action for CN Application No. 201880059271.0 dated Dec. 3, 2020 (12 pages).
(Continued)

*Primary Examiner* — Amy J. Sterling
(74) *Attorney, Agent, or Firm* — Merchant & Gould P.C.

(57) ABSTRACT

The present invention concerns an extension frame (1, 7, 18, 27) comprising a flange (2, 8, 19, 29, 31) and a box (3, 9, 20). The flange (2, 8, 19, 29, 31) is placed at one end of the box (3, 9, 20). A through opening is formed going through the centre of the box (3, 9, 20) and through the flange (2, 8, 19, 29, 31). A number of holes (4, 5, 10, 11, 21, 22, 33, 34) are provided going through walls of the box (3, 9, 20). Further, a system comprising two extension frames (1, 7, 18, 27) are formed. The two extension frames (1, 7, 18, 27) are placed on opposite sides of a through opening of a partition. A sealing devices (25) for cables or pipes is placed in said through opening of the partition.

20 Claims, 3 Drawing Sheets

(51) Int. Cl.
*F16L 5/04* (2006.01)
*H02G 3/04* (2006.01)

(56) References Cited

U.S. PATENT DOCUMENTS

| | | | | |
|---|---|---|---|---|
| 5,761,027 | A * | 6/1998 | Flegel | H02B 1/056 |
| | | | | 361/825 |
| 5,839,594 | A * | 11/1998 | Barbour | H02G 3/22 |
| | | | | 220/3.7 |
| 7,825,335 | B2 | 11/2010 | Carbone et al. | |
| 8,316,609 | B2 * | 11/2012 | Ben-Zvi | E04D 3/28 |
| | | | | 52/459 |
| 8,507,798 | B2 | 8/2013 | Sempliner et al. | |
| 9,258,919 | B1 * | 2/2016 | Rose | H01R 13/405 |
| 11,108,219 | B2 * | 8/2021 | Korcz | H02G 3/083 |
| 2006/0090411 | A1 * | 5/2006 | Shaw | E04B 1/948 |
| | | | | 52/233 |
| 2007/0151183 | A1 * | 7/2007 | Stahl | F16L 5/04 |
| | | | | 52/317 |
| 2007/0175649 | A1 * | 8/2007 | Moselle | H02G 3/088 |
| | | | | 174/50 |
| 2016/0049778 | A1 * | 2/2016 | Moench | H02G 3/121 |
| | | | | 174/535 |
| 2017/0338635 | A1 * | 11/2017 | Stahl, II | H05K 3/38 |
| 2018/0298605 | A1 * | 10/2018 | Koehler | A62C 2/065 |
| 2019/0195395 | A1 * | 6/2019 | Muenzenberger | F16L 5/04 |

FOREIGN PATENT DOCUMENTS

| | | |
|---|---|---|
| DE | 202014001922 U1 | 7/2014 |
| EP | 0178193 | 4/1986 |
| EP | 0 486 299 A1 | 5/1992 |
| EP | 0534563 A1 | 3/1993 |
| EP | 0869303 B1 | 10/1998 |
| EP | 0982522 A2 | 3/2000 |
| EP | 2389985 A1 | 11/2011 |
| FR | 2569910 A1 | 3/1986 |
| GB | 2388174 A | 11/2003 |
| GB | 2471075 A | 12/2010 |
| JP | S49149600 U | 12/1974 |
| JP | S5597115 A | 7/1980 |
| JP | H0243723 A | 2/1990 |
| JP | H03273806 A | 12/1991 |
| JP | H06323471 A | 11/1994 |
| JP | 2002250479 A | 9/2002 |
| JP | 2003336331 A | 11/2003 |
| JP | 2008132244 A | 6/2008 |
| JP | 2013502545 A | 1/2013 |
| JP | 2017066810 A | 4/2017 |
| KR | 101628297 B1 | 6/2016 |
| RU | 55514 U1 | 8/2006 |
| RU | 2514736 C2 | 5/2015 |
| WO | 9516083 A1 | 6/1995 |
| WO | 00/68608 A1 | 11/2000 |
| WO | 2013160776 A1 | 10/2013 |
| WO | 2017/079326 A1 | 5/2017 |
| WO | 2017/086859 A1 | 5/2017 |

OTHER PUBLICATIONS

Notice of Opposition for corresponding Swedish Patent No. 540 912, *Roxtec AB* vs. *MCT Brattberg AB* (31 pages).
Reference A1a from Notice of Opposition, Roxtec SE PPS, published 2004—Roxtec SE PPS Extension Frame (1 page).
Reference A1b from Notice of Opposition, Roxtec SE PPS, published 2004, 1 page information drawing, Drawing No. S1006468.
Reference A1c from Notice of Opposition, Roxtec SE PPS, published 2004, 1 page Roxtec image.
Reference A1d from Notice of Opposition, Roxtec SE PPS, published 2004, 1 page Roxtec image.
Reference A1e from Notice of Opposition, Roxtec SE PPS, published 2004, Roxtec International AB 2006, Photo/Illustration Roxtec AB (4 pages).
Reference A1f from Notice of Opposition, Roxtec SE PPS, published 2004, Certificate of Fire Approval Document (3 pages).
Reference A2a from Notice of Opposition, PFC Corofil, published 2007, PFC Corofil Intumescent Firestop Collars (4 pages).
Reference A2b from Notice of Opposition, PFC Corofil, published 2007, PFC Corofil Intumescent Firestop Collars (3 pages).
Reference A2c from Notice of Opposition, PFC Corofil, published 2007, PFC Corofil Intumescent Firestop Collars, Protecting People, Buildings and the Environment (1 page).
Reference A2d from Notice of Opposition, PFC Corofil, published 2007, wayback machine PFC Corofil document (1 page).
Reference A2e from Notice of Opposition, PFC Corofil, published 2007, wayback machine PFC Corofil Intumescent Firestop Collas document (1 page).
Reference A2f from Notice of Opposition, PFC Corofil, published 2007, IFC Certification Penetration & Linear Gap Seals Scheme SDP13 (1 page).
Reference A3a from Notice of Opposition, HILTI Firestop collar CFS, published 2015, Firestop Collar CFS-C P—HILTI (5 pages).
Reference A3b from Notice of Opposition, HILTI Firestop collar CFS, published 2015, HILTI Technical Data Sheet, HILTI Firestop Collar CFS-C P, (38 pages).
Reference A3c from Notice of Opposition, HILTI Firestop collar CFS, published 2015, Declaration of Performance according to Annex III of the Regulation (EU) NR. 305/2011 (Constructions Products Regulation), HILTI (33 pages).
Reference A3d from Notice of Opposition, HILTI Firestop collar CFS, published 2015, CFS-C P 50-160mm, HILTI (1 page).
Reference A3e from Notice of Opposition, HILTI Firestop collar CFS, published 2015, European Technical Assessment—ETA-10/0404 (41 pages).
Reference A4a from Notice of Opposition, MCT Insulation honder, published 2014, MCT Brattberg AB, Drawing No. Draft (1 page).
Reference A4b from Notice of Opposition, MCT Insulation honder, published 2014, MCT Brattberg AB, Drawing No. 1120287 (1 page).
Reference A4c1 from Notice of Opposition, MCT Insulation honder, published 2014, MCT Brattberg AB, (1 page).
Reference A4c2 from Notice of Opposition, MCT Insulation honder, published 2014, MCT Brattberg AB, (1 page).
Reference A4d from Notice of Opposition, MCT Insulation honder, published 2014, MCT Brattberg AB, Email from Anders Karlsson dated Feb. 25, 2016 (3 pages).
Reference A4e from Notice of Opposition, MCT Insulation honder, published 2014, MCT Brattberg AB (2 pages).
Reference A4f1 from Notice of Opposition, MCT Insulation honder, published 2014, MCT Brattberg AB (1 page).
Reference A4f2 from Notice of Opposition, MCT Insulation honder, published 2014, MCT Brattberg AB, Egenskaper (1 page).
Reference A8a from Notice of Opposition, Roxtec Ram published 2014—Oppningsbar Ram, Roxtec GKO transit (8 pages).
International Search Report for International Application No. PCT/SE2018/050870 dated Oct. 29, 2018 (3 pages).
Russian Office Action for RU Application No. 2020110906/07 dated Oct. 15, 2021 (6 pages).
Supplementary European Search Report for EP Application No. 18856931.3 completed Apr. 26, 2021 (8 pages).
Indian Examination Report for IN Application No. 202027015140 dated Oct. 9, 2021 (5 pages).
Japanese Office Action for JP Application No. 2020-513323 dated Jul. 27, 2022 (7 pages, with English translation).

* cited by examiner

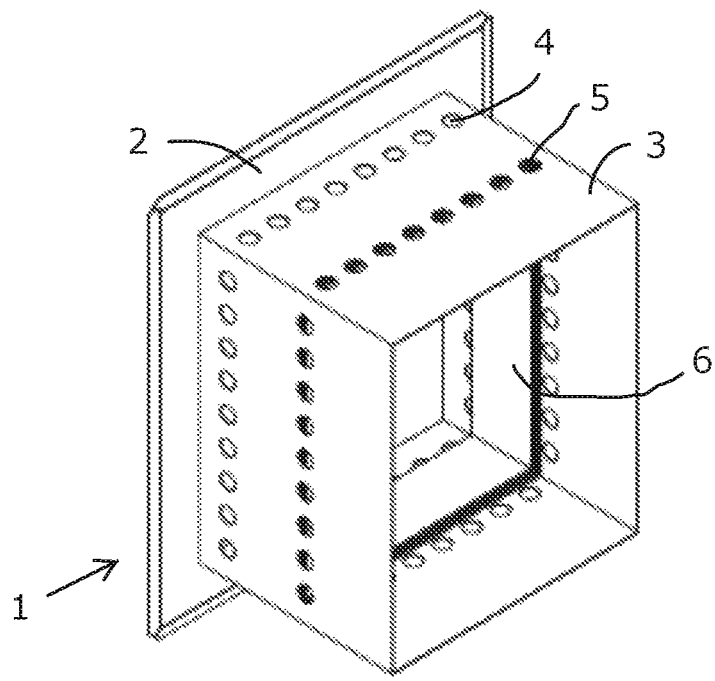
Fig. 1
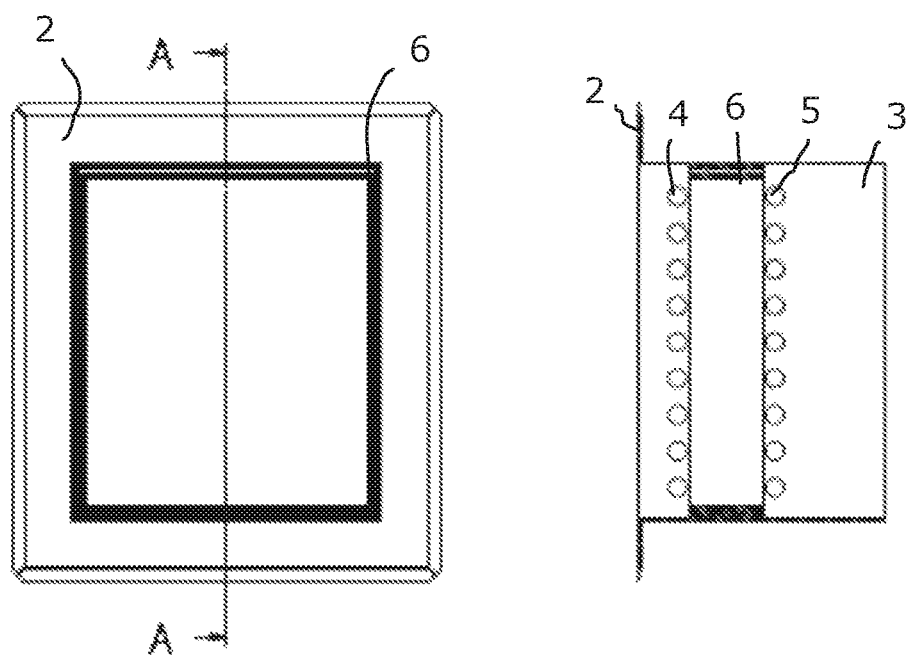
Fig. 2
Fig. 3

EXTENSION FRAME

This application is a National Stage Application of PCT/SE2018/050870, filed 30 Aug. 2018, which claims benefit of Serial No. 1751103-1, filed 12 Sep. 2017 in Sweden and which applications are incorporated herein by reference. To the extent appropriate, a claim of priority is made to each of the above disclosed applications.

TECHNICAL FIELD

The present invention concerns extension frames used when leading cables or pipes through walls or other types of partitions.

BACKGROUND

To lead cables and/or pipes through a wall or other partition different kinds of cable and/or pipe transitions or penetrations are used. To give a sealed transition some kind of seal is normally placed inside the transition. The seal is normally placed in an opening in the partition, either directly in the opening or inside a frame placed in the opening. One example of seals comprises a number of compressible modules, wherein each such module is to receive a cable or pipe. Such modules are normally received side by side in one or more rows together with some kind of compression unit inside a frame. By means of the compression unit the modules are compressed in one direction in such a way that the modules will seal inwards around the cables and/or pipes and outwards against the inside of the transition.

Cable and pipe transitions are used in many different environments, such as for cabinets, technical shelters, junction boxes and machines. They are used in different industrial environments, such as automotive, telecom, power generation and distribution, as well as marine and offshore. They may have to seal against fluid, gas, fire, rodents, termites, dust, moisture etc. and many receive cables for electricity, communication, computers etc. or pipes for different gases or liquids such as water, compressed air, hydraulic fluid and cooking gas.

For many installations there are demands of fire performance. One example of such a demand is integrity and insulation criteria of 60 min., i.e. that fire shall not have burnt through and the temperature on the non-fire side shall not be raised more than 180° C. during this time. In another example the same applies for a time period of 120 min.

It is common to place some kind of fire protection inside a frame of the transition or in connection to the transition. One example of fire protection is to use intumescent material. Intumescent material is a material that swells when exposed to excessive heat, such as in case of fire. It is well known in this technical field to use intumescent material as a fire protection. The intumescent material will function as insulation material for the cables when a fire occur.

One problem when designing fire protection for a transition is that the cables themselves are transferring the heat through the system. In view of the demands, a solution is wanted which guarantees that the heat of the separate cables or pipes does not raise more than 180° C. on the non-fire side. One way of achieving fire protection is to add additional insulation on the cables. The problem is that by adding insulation the capacity of the power cables might be derated. In one example the derating was about 55% for a cable when adding insulation on a length of 400 mm. All kinds of insulation placed around or wrapped around a cable might derate the cable depending on cable size and insulation length.

In many applications, i.e. hospital, cleanroom etc. you are not allowed to have insulation due to pollution. Thus, even if it may function in relation to the fire demands to use insulation, it is not always accepted.

SUMMARY

In view of the above one object of the present invention is to have a system that works in a large number of applications and that fulfils the demands. A further object is not to have to add any additional insulation on the cables.

According to one aspect of the present invention, an extension frame comprising a flange and a box is provided. The flange is placed at one end of the box. A through opening is formed going through the centre of the box and through the flange. A number of holes are provided going through walls of the box.

The holes of the extension frame placed on the fire side will improve the reaction time of the intumescent material. Thereby the intumescent material can react as fast as possible and by that start to act as an insulation around the cables. The holes of the extension frame on the non-fire side will ventilate the frame and thereby cool the cables. Thus, the holes have a double function with different purpose depending on which side of the wall the extension frame is placed. The depth of the frame, amount of the intumescent material, amount of holes and size, one or two extension frames might be varied depending on the fire performance.

According to another aspect of the present invention a system is provided wherein two extension frames are configured to be placed on opposite sides of a partition in connection with a sealing device placed in a through opening of the partition.

Further objects and advantages of the present invention will be obvious to a person skilled in the art when reading the detailed description below.

BRIEF DESCRIPTION OF THE DRAWINGS

The invention will be explained further below by way of example and with reference to the enclosed drawings. In the drawings:

FIG. 1 is a perspective view of a first embodiment of an extension frame according to the present invention;

FIG. 2 is a front view of the extension frame of FIG. 1;

FIG. 3 is a section view taken along the line A-A in FIG. 2;

DETAILED DESCRIPTION

Figure 4:
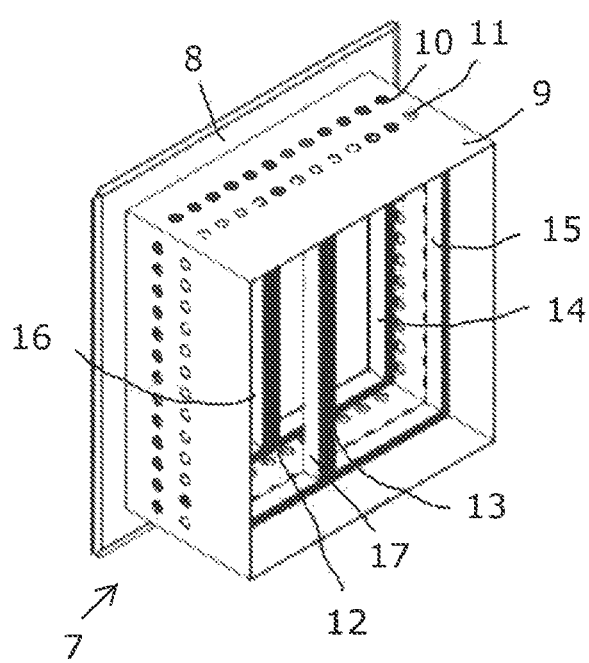
FIG. 4 is a perspective view of a second embodiment of an extension frame according to the present invention.

As used in this description the expressions "vertical", "horizontal" and similar expressions are in view of the drawings referred to and do not necessarily represent the orientation in use. A person skilled in the art realise that the extension frame of the present invention may be installed with optional orientation.

In FIG. 1 one embodiment of an extension frame 1 is shown. The extension frame 1 of FIG. 1 comprises a flange 2 and a box 3. The box 3 is an open box having four walls. The flange 2 of the extension frame 1 is to be fastened to a partition, such as a wall. The box 3 extends from one side of the flange 2 of the extension frame 1. A through opening is formed inside the extension frame 1, which through opening goes through both the flange 2 and the box 3. The extension frame 1 is to form a part of a transition or penetration for cables or pipes. The cables etc. are to go through the through opening of the extension frame 1. Normally, one extension frame 1 is placed on both sides of the partition.

The box 3 of each extension frame 1 has a first row of holes 4 and a second row of holes 5 going around the circumference of the box 3. The first and second rows of holes 4, 5 are placed in parallel to each other. The holes 4, 5 are arranged with equal spacing in respective row and goes through the walls of the box 3. The first row of holes 4 is placed closer to the flange 2 of the extension frame 1 than what the second row of holes 5 is. A strip of intumescent material 6 is placed on the inner circumference of the box 3. The strip of intumescent material 6 has an axial length that is shorter than the axial length of the box 3. As used here the axial length is taken as the axial direction of a cable or the like to be received inside the extension frame 1. In the shown embodiment the strip of intumescent material 6 is placed between the first and second rows of holes 4, 5, as indicated in FIG. 3.

In FIG. 4 a second embodiment of an extension frame 7 is shown. The extension frame 7 comprises a flange 8 and a box 9. The box 9 is an open box having four walls. The flange 8 of the extension frame 7 is to be fastened to a partition, such as a wall. The box 9 extends from one side of the flange 8 of the extension frame 7. A through opening is formed inside the extension frame 7, which through opening goes through both the flange 8 and the box 9. The extension frame 7 is to form a part of a transition or penetration for cables or pipes. The cables etc. are to go through the through opening of the extension frame 7.

The box 9 of the extension frame 7 has a first row of holes 10 and a second row of holes 11 arranged around the circumference of the box 9. The holes 10, 11 goes through the walls of the box 9 and are arranged at equal spacing in respective row. The first and second rows of holes 10, 11 are parallel to each other. The first row of holes 10 is placed closer to the flange 8 than what the second row of holes 11 is. A first bar 12 is arranged going between two opposite walls of the box 9, which first bar 12 is arranged between the area of the flange 8 and the first row of holes 10 of the extension frame 7. A second bar 13 is arranged in line with the first bar 12 and goes between the same opposite walls of the box 9 as the first bar 12. The second bar 13 is arranged between the second row of holes 11 and the end of the box 9 opposite the flange 8, and adjacent the second row of holes 11. The second bar 13 does not extend all the way to the end of the box 9 opposite the flange 8. By means of the first and second bars 12, 13 the inside of the extension frame 1 is in practice divided into two chambers.

A first strip of intumescent material 14 is placed on one side of the first bar 12 and three walls of the box 9, on the inner side of the box 9. A second strip of intumescent material 15 is placed on one side of the second bar 13 and three walls of the box, on the inner side of the box 9. A third strip of intumescent material 16 is placed on the first bar 12 and three walls of the box 9, on the inner side of the box 9. Said third strip of intumescent material 16 is placed on the opposite side of the first bar 12 in relation to said first strip of intumescent material 14. A fourth strip of intumescent material 17 is placed on one side of the second bar 13 and three walls of the box 9, on the inside of the box 9. Said fourth strip of intumescent material 17 is placed on the opposite side of the second bar 13 in relation to said second strip of intumescent material 15. By having multiple strips a better distribution of the intumescent material can be achieved.

The first and third strips of intumescent material 14, 16 are placed between the flange 8 and the first row of holes 10 of the extension frame 18, adjacent said first row of holes 10. The second and fourth strips of intumescent material 15, 17 are placed between the second row of holes 11 and the axial end of the extension frame 7 opposite the flange 8. Said second and fourth strips of intumescent material 15, 17 are placed adjacent the second row of holes 11.

Figure 5:
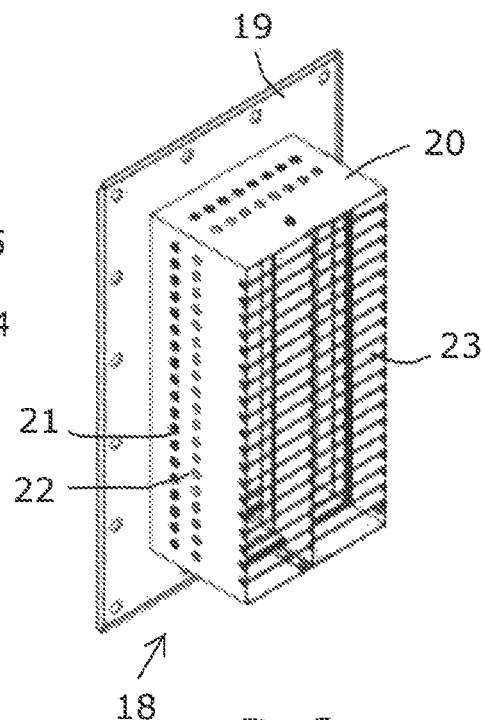
FIG. 5 is a perspective view of an extension frame illustrating an optional feature.

In FIG. 5 a further embodiment of an extension frame 18 is shown. In the same way as for the previously described embodiments, the extension frame 18 comprises a flange 19 and a box 20. The box has a first row of holes 21 and a second row of holes 22. A grid 23 is placed covering the end of the box 20 opposite the flange 19 of the extension frame 18. As for the previous embodiments one or more strips of intumescent material is placed on the inside of the box 20. By means of the grid 23 contact with inner parts of the extension frame 18 is prevented. In use openings are made in the grid 23 for the cables or pipes to be going through the extension frame 18.

It is possible to use a grid 23, as indicated in FIG. 5, with either of the previously described embodiments.

Figure 6:
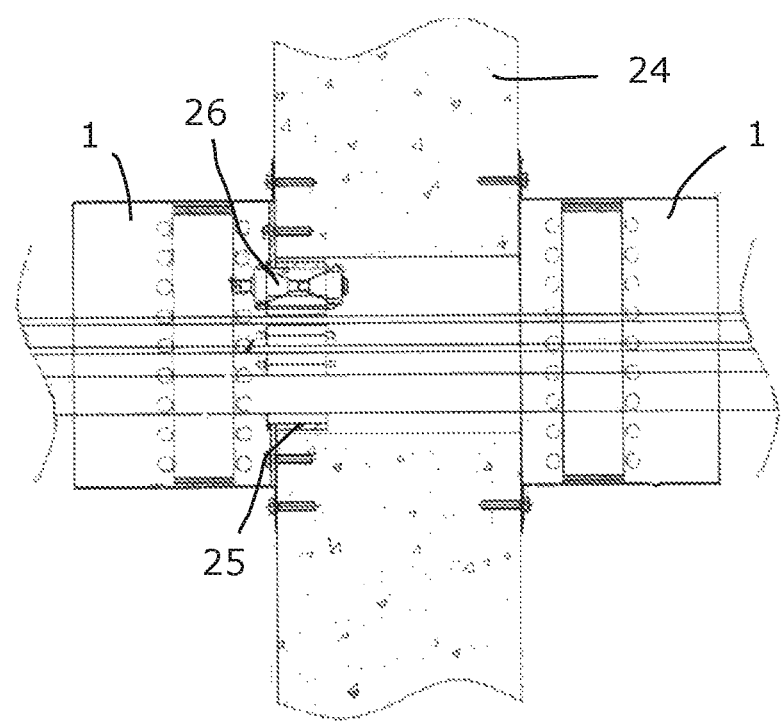
FIG. 6 is a section view illustrating one example of installation of extension frames according to the present invention.

In FIG. 6 one example of using an extension frame according to the present invention is shown. In the shown example two extension frames 1 are placed on opposite sides of a wall 24. A transition 25 is placed in a through opening of the wall 24 and the two extension frames 1 are placed in line with each other and the through opening of the wall 24. In the shown example, the transition comprises a compression unit 26. Even though they are the same, the benefit of each extension frame 1 differs depending on if it is on the side where the fire occurs or if it is on the non-fire side.

Each extension frame is normally made openable, for instance by being made of two or more parts.

Figure 7:
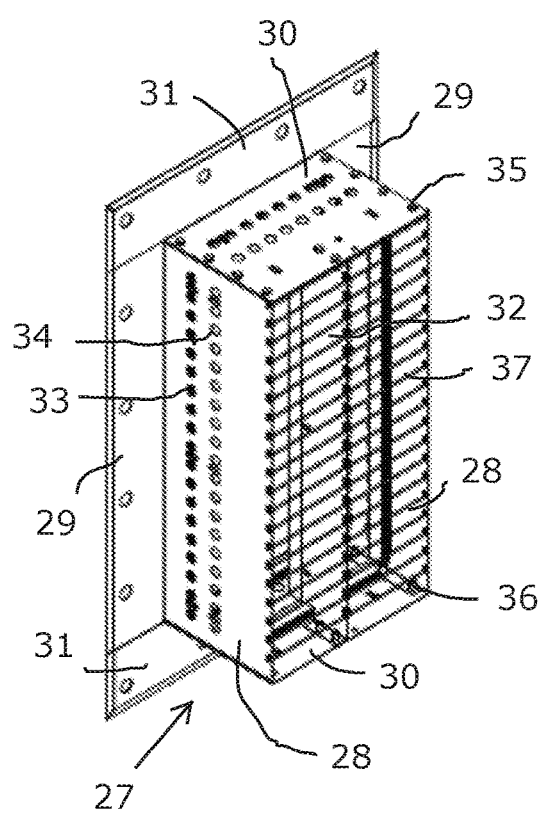
FIG. 7 is a perspective view of a third extension frame according to the present invention.
Figure 8:
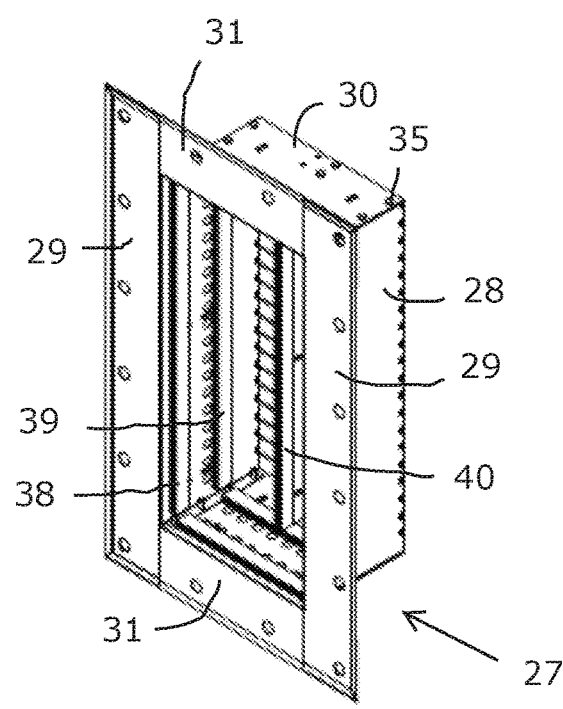
FIG. 8 is a perspective view of the extension frame of FIG. 7 taken from another direction.

In FIGS. 7 and 8 one example of an openable extension frame 27 is shown. The extension frame 27 is formed of four parts. The four parts are two vertical walls 28 with integrated vertical flanges 29 and two horizontal walls 30 with integrated horizontal flanges 31. Each vertical wall 28 and integrated flange 29 are arranged at right angle to each other, giving an L-form as seen in end view. In a corresponding way each horizontal wall 30 and integrated flange 31 are arranged at right angle to each other, giving an L-form as seen in end view. Each vertical wall 28 is connected to the horizontal walls 30, with one horizontal wall 30 at opposite ends of the vertical wall 28, in such a way that a box is formed and that a continuous outer flange is formed at one side of the formed box. In the shown embodiment the vertical and horizontal flanges 29, 31 have an equal width. Each vertical and horizontal flange 29, 31 projects a distance beyond each end of the integrated vertical and horizontal wall 28, 30. The vertical and horizontal flanges 29, 31 projects a distance that corresponds with the equal width of the vertical and horizontal flanges 29, 31.

In the shown embodiment an intermediate vertical wall 32 is placed going between the horizontal walls 30 of the box.

The intermediate vertical wall 32 only extend a part of the depth of the box formed by the vertical and horizontal walls 28, 30. The intermediate vertical wall 32 is placed at the side of the formed box opposite the side having the vertical and horizontal flanges 29, 31.

Each vertical and horizontal wall 28, 30 has a first row of holes 33 and a second row of holes 34, which first and second row of holes 33, 34 are parallel. The holes of the first and second row of holes 33, 34 are placed at equal spacing and goes through the horizontal and vertical walls 28, 30, respectively. The first row of holes 33 are placed closer to the vertical and horizontal flanges 29, 31 than the second row of holes 34 is. In the box formed of the vertical and horizontal walls 28, 30 the first and second row of holes 33, 34 goes around the circumference of the box.

The vertical and horizontal walls 28, 30 are fastened to each other by means of screws 35 and co-operating nuts 36. The ends of the vertical walls 28 are folded inwards, which folded parts are to abut the horizontal walls 30 in the formed box. Through holes for receiving the screws 35 are placed at the ends of the horizontal walls 30 and correspondingly placed holes goes through the folded ends of the vertical walls 28. Thus, each screw 35 will go through a hole in a horizontal wall 30 and in a folded part of a vertical wall 28. Also the ends of the intermediate vertical wall 32 are folded, which folded ends are to be placed abutting the horizontal walls 30. Through holes are provided through the horizontal walls 30 and the folded ends of the intermediate wall 28, which through holes are to received screws 35. The intermediate vertical wall 32 is fastened to the horizontal walls by means of co-operating screws 35 and nuts 36.

In the embodiment of FIGS. 7 and 8 a grid 37 is placed over the open end of the box formed by the vertical and horizontal walls 28, 30. The grid 37 is placed at the side of the box opposite the side having the vertical and horizontal flanges 29, 31.

A first strip of intumescent material 38 is placed on the inner circumference of the box formed by the vertical and horizontal walls 28, 30. The first strip of intumescent material 38 is placed between the first row of holes 33 and the side of the box having the vertical and horizontal flanges 29, 31. A second strip of intumescent material 39 is placed on the inside of the box. The second strip of intumescent material 39 is placed on one side of the intermediate vertical wall 32, the horizontal walls 30 and on one vertical wall 28. A third strip of intumescent material 40 is placed on the inside of the box. The third strip of intumescent material 40 is placed on the intermediate vertical wall 32, the horizontal walls 30 and on one vertical wall 28. The second and third strips of intumescent material 39, 40 are placed on opposite sides of the intermediate vertical wall 32 and on opposite vertical walls 28. The second and third strips of intumescent material 39, 40 are placed adjacent the second row of holes 34, between the second row of holes 34 and the side of the box opposite the side having the vertical and horizontal flanges 29, 31.

In use the extension frame 27 may be placed around existing cables or pipes. This is done by separating one or more of the vertical and horizontal walls 28, 30 from the formed box by removing the appropriate screws 35. The remaining part of the box is then placed surrounding the existing cables or pipes, where after the separated one or more vertical and horizontal walls 28, 30 are again fastened to the remaining part of the box by means of co-operating screws 35 and nuts 36.

The vertical and horizontal flanges 29, 31 of the formed extension frame 27 is to be fastened to a partition, such as a wall.

A person skilled in the art realises that features of the shown embodiments may be combined in different ways than as shown in the drawings.

The invention claimed is:

1. An extension frame for leading cables or pipes through a partition, wherein the extension frame comprises a flange and a box, wherein the flange is placed at one end of the box and wherein a through opening is formed going through a center of the box and through the flange wherein a number of holes are provided going through walls of the box, and one or more strips of intumescent material are placed on an inside of the box, wherein the one or more strips of intumescent material are arranged to allow the holes to ventilate the extension frame on a non-fire side of the partition and thereby cool cables and pipes placed in the through opening.

2. The extension frame of claim 1, wherein the holes are arranged in rows going around the circumference of the box, wherein the holes are placed in a first row of holes and a second row of holes, which rows are parallel to each other, wherein the holes are arranged with equal spacing in each row.

3. The extension frame of claim 2, wherein one or more strips of intumescent material goes around an inner circumference of the box.

4. The extension frame of claim 2, wherein one strip of intumescent material is placed between the first row of holes and the second row of holes.

5. The extension frame of claim 2, wherein one strip of intumescent material is placed between one edge of the box and one row of holes.

6. The extension frame of claim 2, wherein one or more strips of intumescent material are placed between the flange of the extension frame and the first row of holes, and wherein one or more strips of intumescent material are placed between the second row of holes and the end of the box opposite the flange of the box.

7. The extension frame of claim 2, wherein each strip of intumescent material is placed adjacent the first and/or second row of holes.

8. The extension frame of claim 1, wherein the box comprises four walls.

9. The extension frame of claim 8, wherein a first bar and a second bar are placed between opposite walls of the box and wherein a strip of intumescent material is placed on opposite sides of respective bar and on three walls of the box.

10. The extension frame of claim 1, wherein a grid is placed on the edge of the box opposite the flange of the box.

11. The extension frame of claim 1, wherein the extension frame is openable.

12. The extension frame of claim 11, wherein the extension frame is openable in that two vertical walls and two horizontal walls are fastened to each other by means of co-operating screws and nuts, wherein each vertical wall is integrated with a vertical flange and each horizontal wall is integrated with a horizontal flange, wherein each vertical wall and each vertical flange are arranged in right angle to each other, and wherein each horizontal wall and each horizontal flange are arranged in right angle to each other.

13. The extension frame of claim 12, wherein an intermediate vertical wall is fastened to the two horizontal walls in a position between the two vertical walls, wherein the intermediate vertical wall extends between the second row of holes and the side of the extension frame opposite the side having the flange, and wherein strips of intumescent material are arranged on opposite sides of the intermediate vertical wall, on one vertical wall and on the two horizontal walls.

14. A system comprising two extension frames according to claim 1, wherein the extension frames are configured to be placed on opposite sides of a partition, that the extension frames are placed at a through opening of the partition.

15. The system of claim 14, wherein each extension frame is fixed with a flange against the partition.

16. The system of claim 14, wherein the sealing device comprises a frame, modules and a compression unit, whereby the modules and the compression unit are placed inside the frame of the sealing device.

17. The extension frame of claim 1, wherein the through opening extends through an end of the box opposite the flange.

18. An installation for leading cables or pipes through a through opening in a partition, wherein the installation comprises at least one extension frame and one or more cables or pipes, wherein said extension frame comprises a flange, a box and a through opening, wherein the flange is placed at one end of the box and is fastened to the partition, wherein the box extends from the flange and away from the partition, and wherein the through opening goes through a center of the box and through the flange, wherein the one or more cables or pipes go through the through opening of the extension frame and through the through opening of the partition, wherein a number of holes are provided going through walls of the box, and one or more strips of intumescent material are placed on the inside of the box, wherein the one or more strips of intumescent material are arranged to allow the holes to ventilate the extension frame on a non-fire side of the partition and thereby cool the one or more cables or pipes placed in the through opening.

19. The installation of claim 18, wherein the through opening extends through an end of the box opposite the flange.

20. The installation of claim 17, wherein the extension frame is placed on one side of the partition and another extension frame is extending away from an opposite side of the partition at the through opening of the partition, and wherein the installation further comprises a sealing device for cables or pipes.

* * * * *